(12) United States Patent
Glad et al.

(10) Patent No.: US 11,385,718 B2
(45) Date of Patent: *Jul. 12, 2022

(54) MOVEMENT CAPABILITY FOR BUTTONLESS TOUCHPADS AND FORCEPADS

(71) Applicant: Cirque Corporation, Sandy, UT (US)

(72) Inventors: Paul Glad, Sandy, UT (US); Jared Bytheway, Sandy, UT (US); Jon Bertrand, Taylorsville, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/158,114

(22) Filed: Jan. 26, 2021

(65) Prior Publication Data

US 2021/0149493 A1 May 20, 2021

Related U.S. Application Data

(63) Continuation-in-part of application No. 16/563,604, filed on Sep. 6, 2019, now Pat. No. 10,928,911, which is a continuation of application No. 15/202,430, filed on Jul. 5, 2016, now Pat. No. 10,466,789.

(51) Int. Cl.
*G06F 3/01* (2006.01)
*G06F 3/0354* (2013.01)
*G06F 3/041* (2006.01)

(52) U.S. Cl.
CPC .......... *G06F 3/016* (2013.01); *G06F 3/03547* (2013.01); *G06F 3/041* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 5,157,372 | A * | 10/1992 | Langford | G01B 7/18 338/211 |
| 2011/0141052 | A1* | 6/2011 | Bernstein | G06F 3/041 345/174 |
| 2012/0020045 | A1* | 1/2012 | Tanase | H01H 13/85 361/807 |
| 2012/0040721 | A1* | 2/2012 | Infanti | H04M 1/026 455/566 |
| 2014/0002113 | A1* | 1/2014 | Schediwy | G06F 3/0418 324/661 |
| 2015/0243457 | A1* | 8/2015 | Niu | B32B 38/10 200/339 |

* cited by examiner

*Primary Examiner* — Krishna P Neupane

(57) ABSTRACT

A system that provides mechanical movement of a surface of a touch sensor when force is applied, may include a substrate; a touch sensor formed on a substrate; a flex arm coupled to the substrate forming a flexible joint between the substrate and the flex arm; a housing for the touch sensor, the housing supporting the touch sensor at a distal end of the flex arm; and a force sensor integrated into the flex arm.

20 Claims, 11 Drawing Sheets

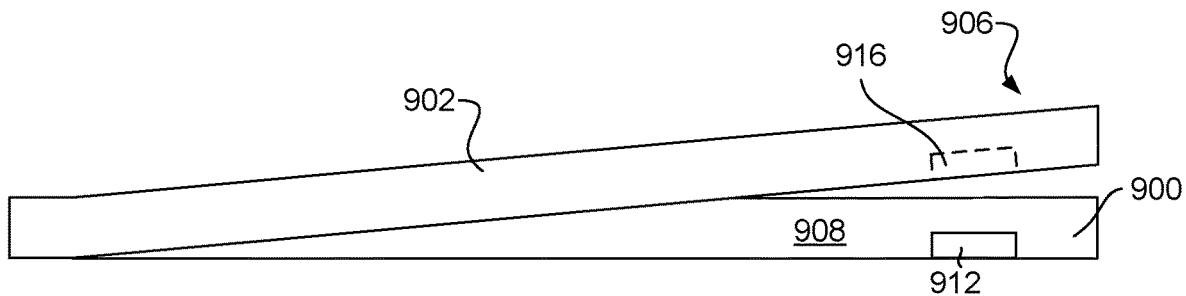
FIGURE 9
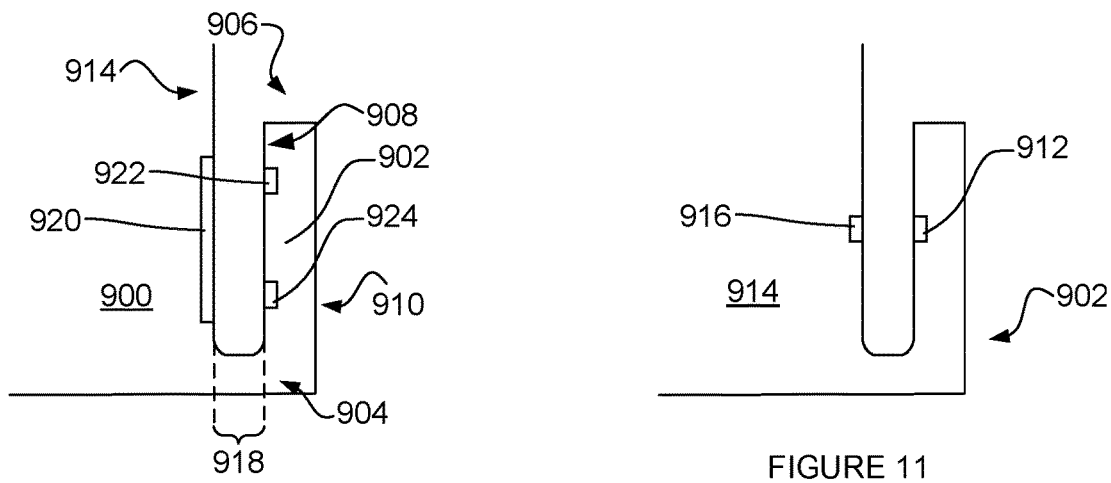
FIGURE 10
FIGURE 11
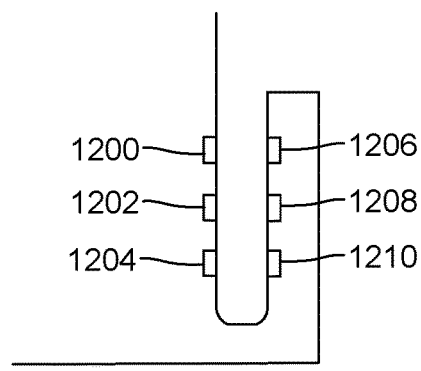
FIGURE 12

MOVEMENT CAPABILITY FOR BUTTONLESS TOUCHPADS AND FORCEPADS

RELATED APPLICATIONS

The present Application is a continuation-in-part of U.S. patent application Ser. No. 16/563,604 by Richard D. Woolley, et al., entitled "Movement Capability for Buttonless Touchpads and Forcepads," filed on Sep. 6, 2019, assigned to the assignee hereof, and expressly incorporated by reference herein. U.S. patent application Ser. No. 16/563,604 claims priority to U.S. patent application Ser. No. 15/202,430 by Richard D. Woolley, et al., entitled "Movement Capability for Buttonless Touchpads and Forcepads," filed on Jul. 5, 2016, assigned to the assignee hereof, and expressly incorporated by reference herein.

BACKGROUND

Field of the Disclosure

This disclosure relates generally to touch sensors. Specifically, the disclosure pertains to a system and method for enabling an entire touchpad surface to mechanically move if sufficient force is used to press on the touchpad to perform a mouse click function, such as a right click or a left click.

Description of Related Art

There are several constructions for capacitance sensitive touch sensors which may take advantage of a system and method for providing mechanical movement of a touchpad that is buttonless. It is useful to examine the underlying technology of the touch sensors to better understand how any capacitance sensitive touchpad can take advantage of the present disclosure.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that may be injected onto the sense line 16 to reestablish or regain balance of charge on the sense line.

The system above is used to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 may not be able to determine on which side of the row electrode the pointing object is located, nor can the touchpad circuitry 20 determine just how far the pointing object is located away from the electrode. Thus, the system may shift by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors. The process above may be repeated for the Y or column electrodes 14 using a P, N generator 24.

Although the CIRQUE® touchpad described above uses a grid of X and Y electrodes 12, 14 and a separate and single sense electrode 16, the sense electrode can actually be the X or Y electrodes 12, 14 by using multiplexing.

It should be understood that use of the term "touch sensor" throughout this document may be used interchangeably with "forcepad", "buttonless touchpad", "proximity sensor", "touch and proximity sensor", "touch panel", "touchpad" and "touch screen".

Buttonless touchpads and forcepads may be touch sensors that may not provide a user friendly haptic sensation of a mechanical "click" when pressed. While the touch sensors are still able to provide the functionality of the mouse click, they nevertheless may fail to provide tactile feedback that may not be necessary, but which may be desirable to users.

Furthermore, many touch sensors do not allow the user to perform a mechanical click, right or left, at a top portion of the touchpad. This is a construction issue due to the mechanical button(s) being mounted at the bottom area of the underside of the touch sensor surface because the touch sensor is hinged near the upper area of the touchpad. It may be that these types of constructions allow about 80% of the touch sensor to be used for "clicking" because a mechanical click on the upper 20% of the pad is either not possible or involves excessive force.

There may be some touch sensors that do not allow any mechanical movement, but instead create an "artificial" click-type response using a motor when the user presses anywhere on the touch sensor, such as in a forcepad. There may also be other forcepad constructions that create an audible "click" sound as the user presses on a touch sensor which senses mechanical pressure. However, these touch sensors also lack mechanical movement of the touch sensor itself.

SUMMARY

In a first embodiment, a system and method may be used to enable an entire touchpad surface to mechanically move if sufficient force is used to press on the touchpad to perform a mouse click function. For example, the movement may be a right click or a left click when the touchpad is mechanically buttonless, such as a forcepad, in order to provide haptic feedback on a touch sensor that otherwise has none.

In some embodiments, a system that provides mechanical movement of a surface of a touch sensor when force is applied, may include a substrate; a touch sensor formed on a substrate; a flex arm coupled to the substrate forming a flexible joint between the substrate and the flex arm; a housing for the touch sensor, the housing supporting the touch sensor at a distal end of the flex arm; and a force sensor integrated into the flex arm.

The force sensor may be a capacitance sensor.

The force sensor may include a transmit electrode formed on the flex arm.

The force sensor may include a sensor electrode formed on the flex arm.

A sense electrode and a sense electrode of the capacitance sensor may be configured to measure a capacitance value across a gap defined between the flex arm and the substrate.

The force sensor may be an electrical resistance sensor.

The electrical resistance sensor may include a deposited ink that changes electrical when the flex arm flexes.

The electrical resistance sensor may include a first trace of deposited ink that changes electrical resistance deposited on a first surface of the flex arm and a second trace of deposited ink that changes electrical resistance deposited on a second surface of the flex arm, where the second surface is opposite to the first surface.

The force sensor may be a strain gauge.

The force sensor may be an optical sensor.

The optical sensor may include an optical fiber attached to the flex arm, a light source connected to the optical fiber at a first end, a light receiver connected to the optical fiber at a second end where the optical fiber is configured to transmit an internal light from the light source to the light receiver, and where an optical intensity of internal light received at the light receiver is configured to vary based on a flex position of the flex arm.

The optical sensor may be a photo transistor attached to a surface of the flex arm a light source position adjacent to the flex arm and oriented to direct a beam of light at the photo transistor, a process, and memory where the memory includes programmed instructions that are configured to determine a flex position of the flex arm based on a location that the light beam contacts the photo transistor.

The touch sensor may be a buttonless touch sensor having no mechanical buttons for performing mouse click functions.

The flex arm may be a first flex arm of multiple flex arms forming multiple flexible joint with the substrate where each of the flex arms has a force sensor integrated thereon.

The touch sensor may have a shape with a first corner, a second corner, a third corner, and a fourth corner; the first flex arm forms a first flexible joint with the substrate at the first corner; the second flex arm forms a second flexible joint with the substrate at the second corner; the third flex arm forms a third flexible joint with the substrate at the third corner; and the fourth flex arm forms a fourth flexible joint with the substrate at the fourth corner. Each of the flex arms could be located at each edge between the four corners.

The substrate, on which the touch sensor is formed, and the flex arm may be made of the same continuous piece of printed circuit board.

In some embodiments, a system for providing mechanical movement of the entire surface of a touch sensor when force is applied, the system may include a substrate for a touch sensor, the substrate forming a rectangular surface; four flex arms wherein each one of the four flex arms is coupled to a different corner or edge of the rectangular surface and flexing at a joint between the substrate and the four flex arms; a housing for the touch sensor, the housing supporting the touch sensor at a distal end of each of the four flex arms; and a touch sensor disposed on the surface of the substrate; a force sensor integrated into the flex arm where the touch sensor is a buttonless touch sensor having no mechanical buttons for performing mouse click functions and where applying a force against the rectangular surface of the touch sensor causes the top surface of the touch sensor to move within the housing to provide haptic feedback to the user while the substrate is flexing at the joint of each of the four flex arms, to thereby provide movement to the buttonless touch sensor.

The force sensor may be a capacitance sensor.

The force sensor may be an electrical resistance sensor.

A computer-program product may have a non-transitory computer-readable medium storing instructions executable by a processor to detect a change in a measurement value from a force sensor integrated into a flex arm attached to a substrate, where a touch sensor is formed on the substrate; and determine that the detected change is an input, independent of inputs through the touch sensor, based at least in part on the strength of the detected change.

These and other objects, features, advantages and alternative aspects of the present disclosure will become apparent to those skilled in the art from a consideration of the following detailed description taken in combination with the accompanying drawings.

BRIEF DESCRIPTION OF THE DRAWINGS

FIG. 9 depicts an example of a touch sensor in a lowered position with an electrode incorporated into a flex arm and another electrode incorporated into a side of a substrate according to the present disclosure.

FIG. 10 depicts an example of a touch sensor with multiple electrodes incorporated into a flex arm and another electrode incorporated into a side of a substrate according to the present disclosure.

FIG. 11 depicts an example of a touch sensor with an electrode incorporated into the flex arm and another electrode incorporated into a side of a substrate according to the present disclosure.

FIG. 12 depicts an example of a touch sensor with electrodes incorporated into a flex arm and multiple electrodes incorporated into a side of a substrate according to the present disclosure.

DETAILED DESCRIPTION OF THE INVENTION

Reference will now be made to the drawings in which the various elements of the present disclosure will be given numerical designations and in which the disclosure will be discussed so as to enable one skilled in the art to make and use the concepts detailed in the disclosure. It is to be understood that the following description is only exemplary of the principles of the present concepts, and should not be viewed as narrowing the claims which follow.

Figure 2:
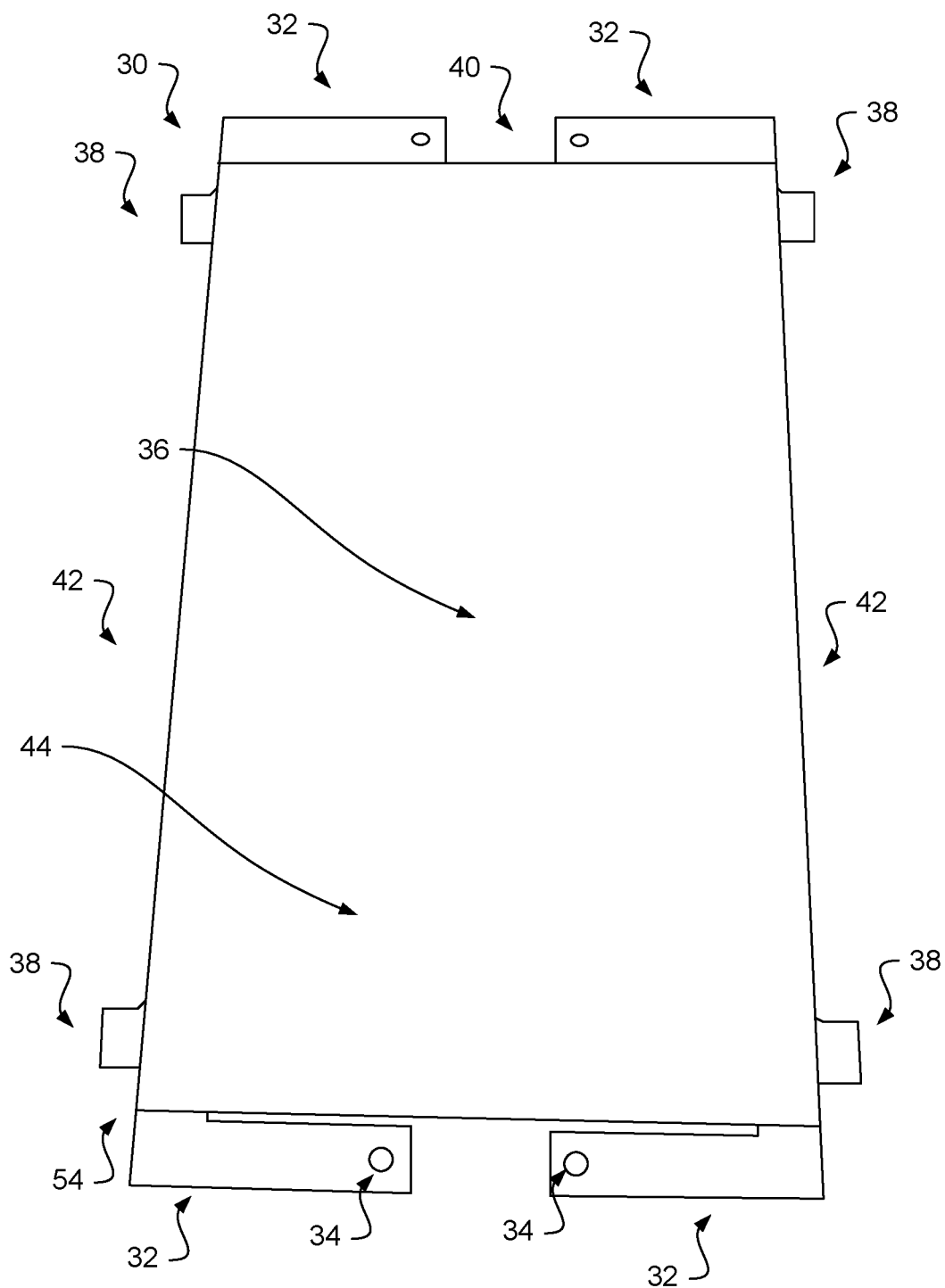
FIG. 2 depicts an example a top view of a substrate and touch sensor disposed thereon, the substrate having four flex arms on each corner of the touch sensor according to the present disclosure.

FIG. 2 is a picture of an embodiment of the touch sensor 30. The touch sensor 30 may be disposed on a substrate that is formed as a continuous piece of material. A first feature of the touch sensor 30 may be the four flex arms 32 that may suspend the touch sensor within a housing (not shown) or a post connected to the housing. The substrate of the touch sensor 30 may be manufactured from a single sheet of flexible material as shown in this first embodiment. For example, the substrate may be comprised of printed circuit board (PCB) or another type of material. The PCB may be sufficiently flexible to enable the four flex arms 32 to provide the desired mechanical action of the touch sensor 30.

In this embodiment, the four flex arms 32 are shown with a hole 34 at the distal end of each flex arm. The hole 34 may be used to position and hold the touch sensor 30 in place within a housing. For example, the hole 34 may be positioned over a projection on the housing on which the hole may be positioned. Applying a force to any portion of the sensor portion 36 of the touch sensor 30 may result in the flexing of the four flex arms 32 where the flex arms are attached to the four corners of the touch sensor.

Alternatively, the four flex arms 32 may be mechanically attached to the touch sensor 30 instead of being an integral part of the structure of the touch sensor, and may still provide the flexibility needed for the touch sensor to be mechanically manipulated by a force applied to the touch sensor.

The length of each of the four flex arms 32 may be the same or they may vary. The four flex arms 32 may vary in width and length. The four flex arms may or may not have the hole 34 for positioning.

In this embodiment, the touch sensor 30 may include four small tabs 38. While the four flex arms 32 may be disposed on the short sides 40 of the touch sensor 30, the tabs 38 may be disposed on the long sides 42 of the touch sensor. The tabs 38 may function to prevent undesired movement of the touch sensor 30. For example, the four tabs 38 may be pivot points that may prevent the touch sensor 30 from lifting out of the housing and to instead assist the touch sensor in moving downward into a depression in the housing when a force is applied to the top surface 44 of the touch sensor.

For example, when pressing on a far left side of the touch sensor 30, the far right side of the touch sensor may try to lift out of the housing. However, if the tabs 38 are actually underneath an edge of the housing, then the housing itself may prevent the touch sensor 30 from lifting out of the housing.

The specific location of the four tabs 38 along the long side 42 may be changed in order to obtain a different depth of movement of the touch sensor 30 when a force is applied to the surface. Accordingly, the position of the four tabs 38 along the long side 42 may be changed in order to achieve different movement characteristics of the touch sensor 30 when a force is applied.

Figure 3:
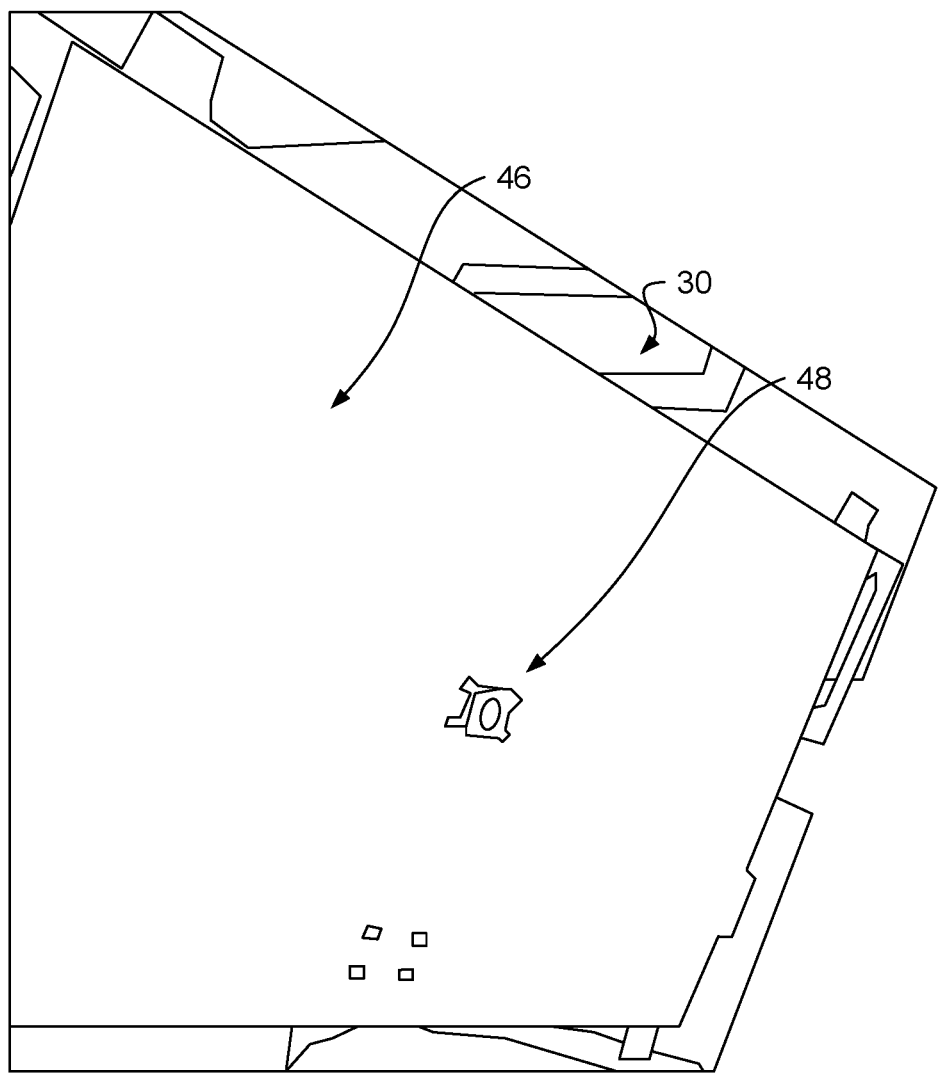
FIG. 3 depicts an example of a bottom of a substrate showing a mechanical switch disposed in a center of the substrate to provide a mechanical switch when the touch sensor is pressed according to the present disclosure.

FIG. 3 is a partial perspective view of a bottom surface 46 of the touch sensor 30. In this first embodiment, the bottom surface 46 shows a switch 48 disposed in approximately a center of the touch sensor 30. The switch 48 may provide a mechanical click function. The mechanical click function may be a haptic movement, a clicking sound, or both.

Figure 4:
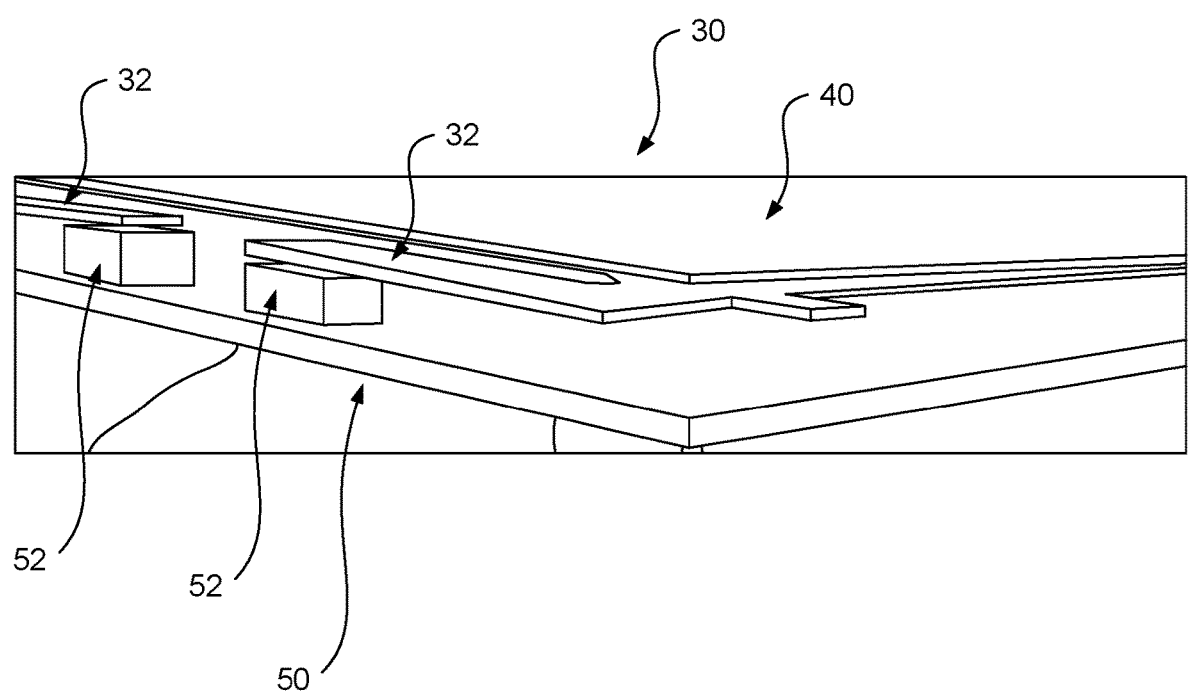
FIG. 4 depicts an example of an edge of a touch sensor showing that a substrate is only supported by a housing at a distal end of each of four flex arms according to the present disclosure.

FIG. 4 is a view of the touch sensor 30 and a supporting structure 50 from a side or edge. The touch sensor 30 is shown as supported by the posts 52 of the supporting structure 50 on the flex arms 32. The flex arms 32 may be the only part of the touch sensor 30 to be in contact with the supporting structure 50. When a force is applied to the top surface 44 of the touch sensor 30, the touch sensor may travel downward, while supported by the four flex arms 32, until the switch 48 on the bottom surface 46 of the touch sensor makes contact with the bottom of a depression in the housing.

One aspect of the first embodiment is that a force may be applied at any location on the top surface 44 of the touch sensor 30 and still cause the entire touch sensor to move in the direction that the force is applied. However, the touch sensor 30 may be tilted so that some areas of the touch sensor moves further than other portions of the touch sensor. Nevertheless, in some cases, all of the top surface 44 of the touch sensor 30 may move down into the housing as the force is applied. Movement continues until the force is removed or until the center switch 48 makes contact with the housing, preventing further movement of the touch sensor 30.

It is an aspect of the touch sensor 30 that the material used for the touch sensor may be flexible enough so that the touch sensor may return to an unflexed or rest position when the force is not being applied.

Figure 1:
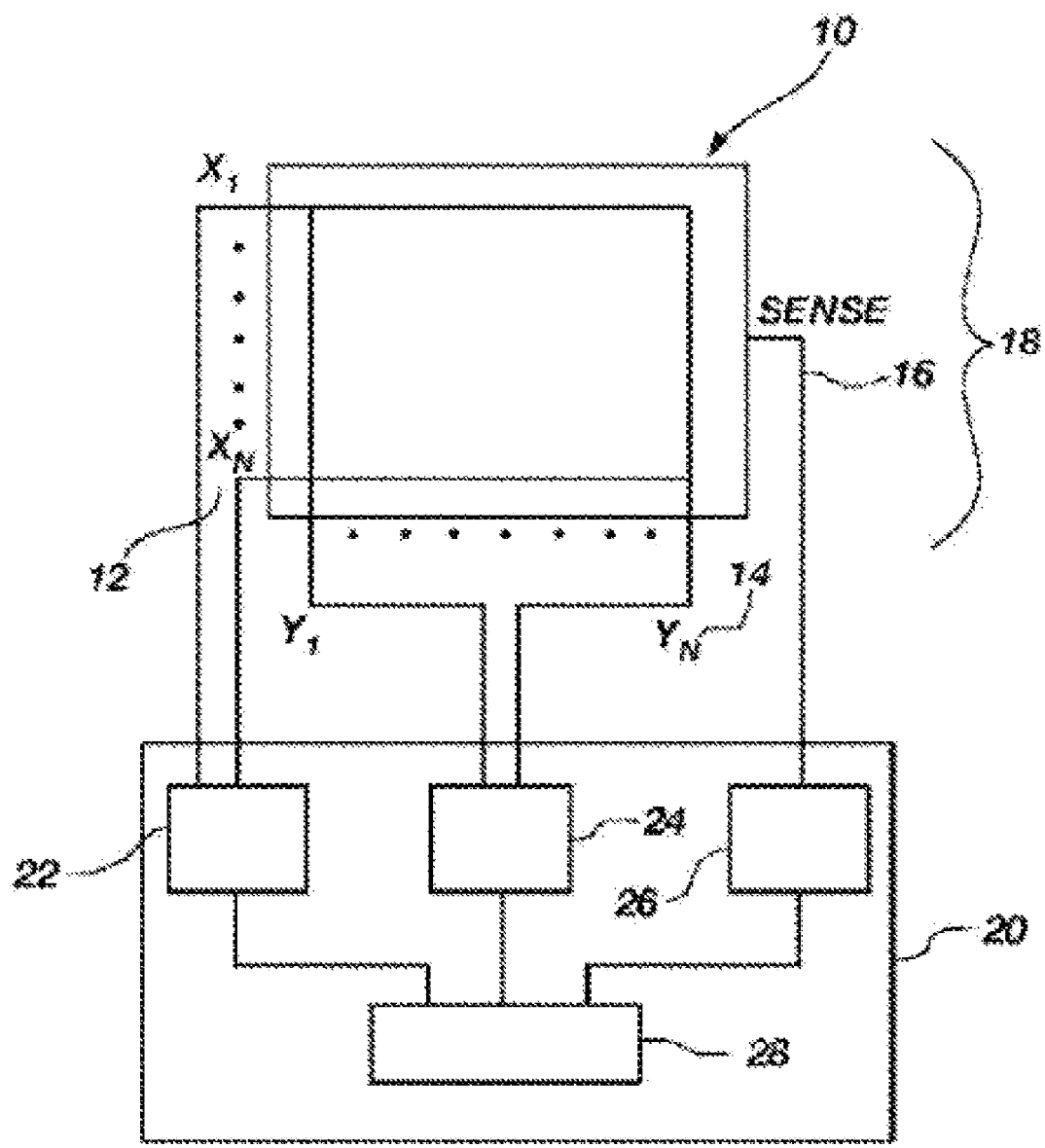
FIG. 1 depicts an operation of a touchpad that is found in the prior art, and which is adaptable for use in the present disclosure.

One advantage of this embodiment and the use of four flex arms 32 may be that the stress on the touch sensor 30 at the joint 54 (see FIG. 1) between the touch sensor and the four flex arms may be more evenly distributed across the joints of the touch sensor. Thus, it may be easier to cause the mechanical movement of the touch sensor 30.

While it is desirable to have the joints 54 flex on the touch sensor 30, it may be undesirable to have the top surface 44 of the touch sensor to flex when a force is applied to perform a click function. One advantage of this embodiment is that a material used to prevent flexing of the surface of the touch sensor 30 may not have to be as rigid if only using only two flex arms 32 because the touch sensor may now move more easily with four flex arms. Alternatively, a thickness of the material used to prevent flexing of the touch sensor 30 may not have to be as thick and thereby increasing sensitivity of the touch sensor.

Another aspect of this embodiment is that a haptics motor may be used to provide additional movement of the touch sensor 30. The additional movement of the touch sensor 30 may be a function of the amount of force or pressure that is applied to the touch sensor. The haptics motor may therefore provide an additional degree of movement of the touch sensor 30. The haptics motor may be located at any location adjacent to or directly on the touch sensor 30 as needed.

Another aspect of this embodiment may be a mechanical spring bias feature. The spring bias feature may be used to apply a force to the bottom surface 46 of the touch sensor 30 and hold it away from the housing. The touch sensor 30 may be held within the housing by the four tabs 38.

It is noted that a spring mounting platform may be provided having a ramped surface and an opposing feature that bends the spring to form a preloaded condition. The touch sensor 30 may be pushed against an inside bezel surface of the housing when the touch sensor 30 is at a rest position when no downward force on the top surface 44 is being applied.

Figure 5:
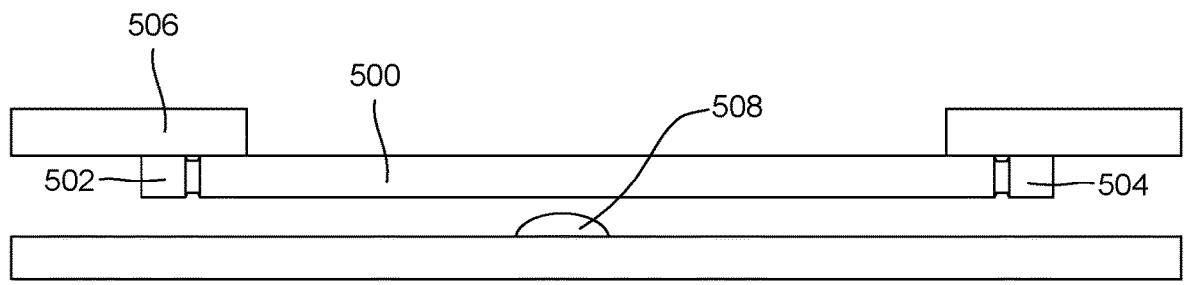
FIG. 5 depicts an example of a touch sensor according to the present disclosure.
Figure 6:
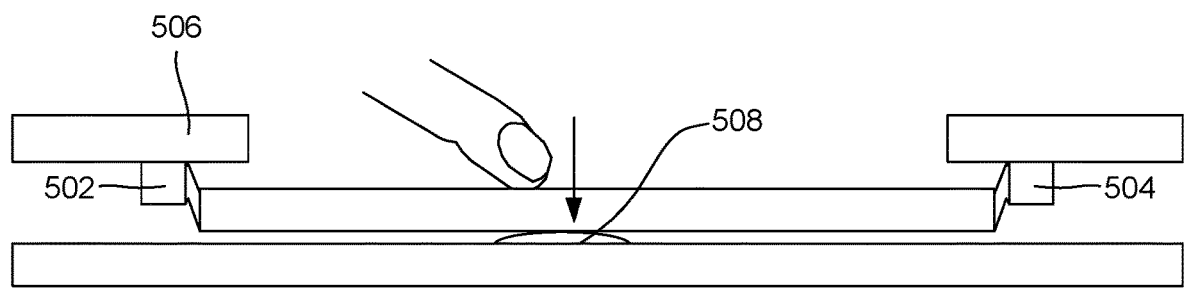
FIG. 6 depicts an example of a touch sensor with a force is applied according to the present disclosure.

FIG. 5 depicts an example where the substrate 500 is positioned between the first flex arm 502 and the second flex arm 504. The first flex arm 502 and the second flex arm 504 are attached to an underside of the housing 506. In the example depicted in FIG. 5, no force is applied to the substrate 500. In this example, without a force applied to the touch surface of the substrate 500, the stiffness of the flex arms 502, 504 maintains the substrate in a rest position that is just under the underside of the housing 506. A haptic feedback mechanism 508 is positioned under the touch substrate. FIG. 6 depicts an example where a force is applied to the substrate with a sufficient force to overcome the stiffness of the first and second flex arms 502, 504. The flex arms have enough elasticity and flexibility to move with the applied force downward away from the underside of the housing 506. In some cases, the applied force is strong enough to cause the entire substrate to move onto the haptic feedback mechanism 508, thereby triggering the haptic feedback mechanism 508 to generate the "click" feedback to the user.

Figure 7:
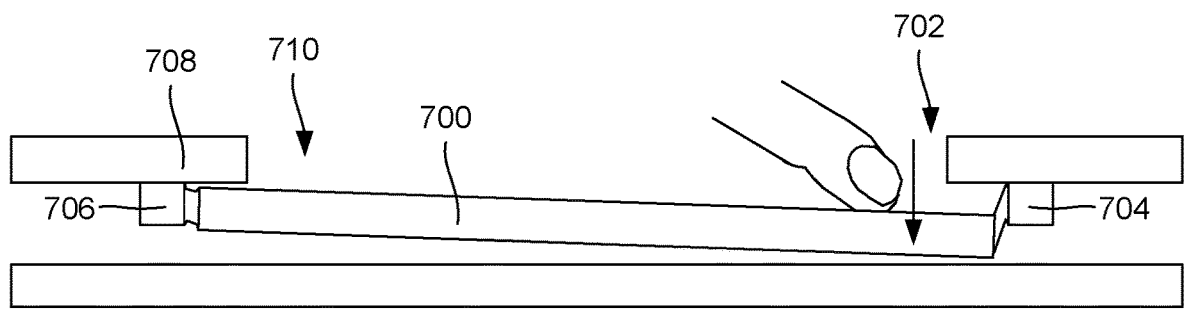
FIG. 7 depicts an example of a touch sensor with a force is applied to a side of the touch sensor according to the present disclosure.

FIG. 7 depicts an example where the force applied to the substrate 700 is applied closer to the substrate's first side 702. As a result, the first flex arm 704 flexes more than the second flex arm 706. In this example, the entire substrate 700 moves downward away from the underside of the housing 708 with the first side 702 of the substrate 700 moving more than the second side 710. However, in other embodiments, when a force is primarily applied to just one side of the substrate, the side with the applied force may primarily move downward while the other side primarily pivots to accommodate the change in angle based on the one side's movement. Thus, in some examples, the movement of the substrate may result in some of the flex arms being flexed to a greater degree than other flex arms. Also, depending on the type of applied force, the flex arms may experience different types of flexing. For example, the flex arms may stretch with the applied force, may bend with the applied force, may twist due to the applied force, experience other types of deformation, or combinations thereof.

Figure 8:
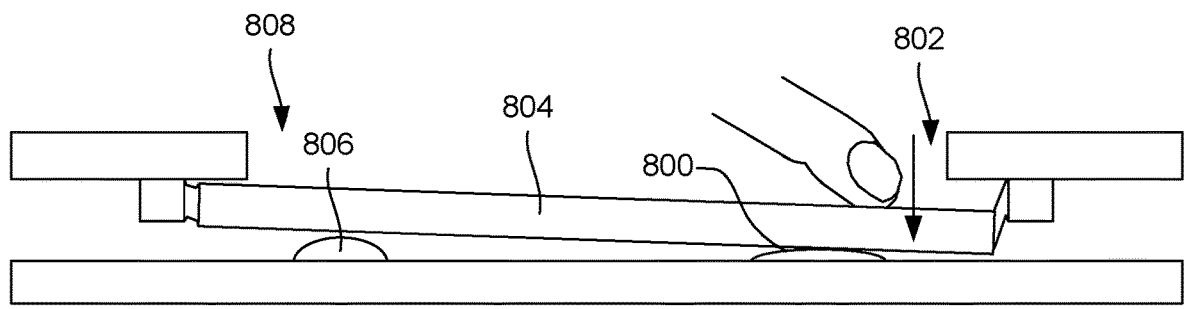
FIG. 8 depicts an example of a touch sensor with a force is applied to a side of the touch sensor where multiple haptic feedback mechanisms are deployed under the touch sensor according to the present disclosure.

FIG. 8 depicts an example with multiple haptic feedback mechanisms. In this example, a first haptic feedback mechanism 800, which is under the substrate's first side 802 with the applied force, is engaged by the substrate and therefore triggered in response to the substrate's contact. On the other hand, with just the first side 802 of the substrate 804 primarily moving downward, a second haptic feedback mechanism 806 may substantially remain at the resting elevation thereby not engaging the second haptic feedback mechanism 806 positioned under the substrate's second side 808. Thus, in some examples, the movement of the substrate may selectively trigger just a subset of all the haptic feedback mechanisms positioned under the substrate.

While the examples of FIGS. 5-8 depict a side view of the substrate and corresponding flex arms, at least two flex arms are depicted in each of these figures. In some examples, just two substrates may be attached to the substrate. For example, a first flex arm may be attached to a first side of the substrate, and a second flex arm may be attached to a second side of the substrate. In some cases, the second side of the substrate may be an opposite side to the substrate's first side. In yet other examples, the second side of the substrate may be a contiguous side to the substrate's first side. In other examples, the substrate may have four corners and a flex arm is attached to or near each of the corners. In some examples, the flex arms may be attached to just some, but not all of the corners of the substrate. In some cases, multiple flex arms may be attached to a single side of the substrate.

In some examples, the system includes a movable substrate with force sensors capable of sensing the force on the substrate. The substrate may have a limited range in which it can move, but the force sensors may detect that the user is intending to provide an input to the system by applying a force to the substrate even with a limited range of movement. This detected force may be recognized as an input into the system. The input may be recognized as an alternative to the tradition "click" input that is provided with mouse buttons, buttons located adjacent to a touch pad incorporated into a computer, a scrolling input mechanism, another type of input mechanism, or combinations thereof.

While this example has been described as having a limiting range, the substrate may be configured to move within any appropriate range. For example, the movement range may be less than half a millimeter, less than one millimeter, less than two millimeters, less than three millimeters, less than five millimeters, another appropriate range, or combinations thereof.

In other examples, the intended input may be recognized when the substrate comes into contact with a mechanism located underneath the substrate. For example, the underside of the substrate may come into contact with a snap dome, another type of switching mechanism, or combinations thereof. When the switching mechanism is triggered, the system may recognize the user's intended input.

The mechanism located underneath the substrate or the force sensor incorporated into the flex arm may be an independent mechanism from the location sensor of the substrate. For example, a substantial amount of the area of the substrate may be dedicated to sense electrodes and/or transmit electrodes that can be used to track the position of a stylus or the user's finger. These sense and/or transmit electrodes may be configured to take capacitance measurements, which are interpreted by a touch controller to determine the location of the stylus, finger, or other object. On the other hand, the force sensor may be used to determine the downward force on the substrate. The force sensor may be independent of the tracking sensor. In some cases, the force sensor may also use capacitance to determine the force. In such cases where the force sensor also uses capacitance, the same touch controller may be used to interpret the measurements for both tracking the location and force. However, in some other examples, a dedicated controller may be used for just the force measurements and another dedicated controller may be used for location tracking. In yet other examples, the force sensor measures other properties than capacitance to determine force.

In one example, a user may slide laterally (x and y directions) his or her finger across the substrate. The position of the finger may be tracked by the tracking/location sensor of the substrate. The finger's movement may be interpreted as an input to move a cursor on a display of a computer or be interpreted as another type of input. In some cases, the user may control the location of the curser by laterally moving the location of the finger. If the user desires to select an object in the display, the user may move the cursor by moving the finger so that the cursor's location overlaps with the position of the object in the display. These movements of the cursor may be independently controlled with the tracking/location sensor. After locating the cursor in the appropriate position, the user may push vertically (z direction) on the substrate. This z direction may be sensed independently by the force sensor. The change in measurements from the force sensor may be interpreted to be an input from the user to select the object in the display. In this described embodiment, the location/tracking sensor may sense the x and y directions, while the force sensor measures the z directions. In some examples, the change in measurements on the force sensor must cross a single, predetermined threshold before interpreting the measurement changes as an input. In such an example, the intensity of the measurement is either enough to be recognized as an input or it is not. In other words, the controller is programmed to recognize binary inputs where the input is triggered or it is not. In other examples, the controller may distinguish between several intensities or measure along a continuous spectrum from the force sensor. In such examples, the controller may be configured to recognize different inputs based on the intensity of the force. As an example, a light force may be interpreted to be an input intended to select an object for dragging across a screen while a more intense force may be interpreted to be an input intended to open a program associated with the object in the display.

In some examples with a mechanism underneath the substrate, such as a snap dome, the mechanism may be used to measure forces from the substrate. In some cases, the mechanism is used to provide a haptic feedback to the user when the snap dome or other mechanism comes into contact with the substrate. In some cases, there is no snap dome or other mechanism underneath the substrate. In such examples, there may also be no haptic actuated response when the substrate is pushed. However, in other examples, the system may recognize the substrate's movement based on the measurements of the force sensor incorporated into the substrate's flex arms. These measurements may trigger a software-based haptic response that causes a haptic actuator to trigger that is located elsewhere than underneath the substrate.

FIGS. 9-12 depict different examples of capacitance sensors incorporated into the substrate and flex arms that are configured to detect the position of the flex arms. In such examples, the substrate 900 and the flex arm 902 may be joined at a flex joint 904. The flex arm 902 may have distal edge 906 that is opposite the flex joint 904. The flex arm 902 may also include an inner edge 908 that connects the distal edge 906 to the flex joint 904 on a side of the flex arm 902 that is closest to the substrate 900 and an outer edge 910 that connects the distal edge 906 to the flex joint 904 on a side of the flex arm 902 that is farthest from the substrate 900. A first electrode 912 may be secured to or near the inner edge 908.

The substrate may have a substrate edge 914 that is closest to the inner edge 908 of the flex arm 902. A second electrode 916 may be secured to or near the inner edge 908. The substrate edge 914 of the substrate 900 and the inner edge 908 of the flex arm 902 may be separated by a gap 918 defined by the substrate edge 914 and the inner edge 908. The first and second electrode 912, 916 may be used to measure a capacitance value across the gap 918. When the flex arm 902 is in the rest position, the capacitance between the first and second electrodes 912, 916 across the gap 918 may be at a baseline level of capacitance. However, when the flex arm 902 moves out of the rest position, such as when a force is applied to the substrate 900, the distance between the first electrode 912 and the second electrode 916 increases, thereby changing the amount of capacitance that is measured between the first electrode 912 and the second electrode 916. Based on the degree of change from the baseline level of capacitance to the new level of capacitance generated from the flex arm's new position, the flex arm's new flex position may be determined.

One of the first electrode 912 of the inner edge 908 of the flex arm 902 or the second electrode 916 of the substrate edge 914 may be a transmit electrode, while the other electrode is a sense electrode. In some cases, the transmit electrode is energized with an electrical voltage thereby generating an electric field that spans the gap. The sense electrode across the gap may be influenced by the electric field of the transmit electrode thereby changing the measurable voltage on the sense electrode. When the measured voltage on the sense electrode changes, a touch controller receiving the measurements may determine that the capacitance between the first and second electrodes has changed and that the flex position of the flex arm has also changed. In such examples, the position of the flex arm may be determined by reading the measured voltage off of the sense electrode.

In the example of FIG. 9, the flex arm 902 is depicted in a flex position with the substrate 900 being pushed downward. In this example, the first electrode is depicted in the flex arm 902 while the second electrode is depicted on the substrate's edge 914. The first and second electrodes 912, 916 are depicted on or near the edge faces of the inner edge 908 and the substrate edge 914. While these electrodes are depicted on the face edge in this example, in other examples, the electrodes may be deposited on the top surface of the substrate, the bottom surface of the substrate, the top surface of the flex arm, the bottom surface of the flex arm, within one of multiple layers of the substrate, within one of multiple layers of the flex arm, on another location of the substrate, on another location of the flex arm, or combinations thereof.

FIG. 10 depicts an example of a single transmit electrode 920 on or near the substrate's edge 914. A first sense electrode 922 and a second sense electrode 924 may be positioned on or near the inner edge 908 of the flex arm 902. The single transmit electrode 920 may influence the capacitance of both the first sense electrode 922 and the second sense electrode 924. However, the sense electrode closest to the flex joint 904 may move less than the sense electrode closest to the distal edge 906 of the flex arm 902 when the flex arm changes its flex position. Thus, as the flex arm 902 flexes, the change in capacitance for each of the two sense electrodes may be different. Such differences may be helpful for calibrating the sense electrodes.

FIG. 11 depicts just a single first electrode 912 on the flex arm 902 and just a single second electrode 916 on the substrate surface 914. FIG. 12 depicts an example with multiple sense electrodes 1200, 1202, 1204 and multiple transmit electrodes 1206, 1208, 1210. In the depicted example, each of the sense electrodes 1200, 1202, 1204 has a corresponding, dedicated transmit electrode 1206, 1208, 1210 on a one-to-one ratio. However, in some cases, there may be more sense electrodes than transmit electrodes, or vice versa.

Figure 13:
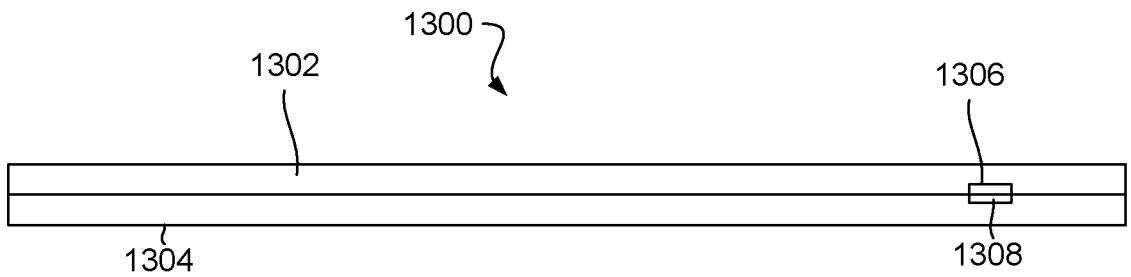
FIG. 13 depicts an example of a flex arm with a top layer and a bottom layer, and a first electrode incorporated into the top layer and a second electrode incorporated into the bottom layer according to the present disclosure.

FIG. 13 depicts an example of a flex arm 1300 that has a first layer 1302 and a second layer 1304. A first electrode 1306 is embedded in the first layer 1302, and a second electrode 1308 is embedded in the second layer 1304. In some cases, the first electrode 1306 is a transmit electrode and the second electrode 1308 is a sense electrode, or vice versa.

In the depicted example, the flex arm 1300 is shown in a rest position where the flex arm 1300 is not being elastically deformed due to an applied force on the substrate. In this rest position, the first and second electrode 1302, 1304 can be used to determine the baseline capacitance when the flex arm 1300 is in a rest position. When the flex arm 1300 is elastically deformed due to the applied force, the stresses in the flex arm 1300 may cause the first and second electrodes 1302, 1304 to misalign. Under these stresses, the misaligned electrodes may read a different capacitance from the baseline capacitance. This measured, different capacitance may be used to determine the flexed position of the flex arm 1300.

In the depicted example, the first and second electrodes 1306, 1308 are embedded in the first and second layers 1302, 1304 respectively. However, in other examples, the first and second electrodes 1306, 1308 may be deposited on the surfaces of the first and second layers 1302, 1304 respectively.

In some cases, the entire substrate is made of the same continuous layers as the first and second layers 1302, 1304 of the flex arm. In one example, the first layer of the flex arm is made of the same continuous material as the substrate. In such an example, the second layer may be adhered, attached, deposited, or otherwise secured to the first layer. In other examples, the second layer of the flex arm is made of the same continuous material as the substrate. The first layer and/or the second layer may be made of any appropriate type of material. For example, the first and second layers may be made of a printed circuit board material or another commercially available substrate material.

The layers may be made of the same materials or different materials. In some examples, the material of the first layer has a different elasticity than the material of the second layer, which may account for a differential movement between the two layers when the flex arm 1300 is in a flex position. In some cases, the first and second layers 1302, 1304 remain bonded to each other throughout the entire interface between the first and second layers 1302, 1304 when the flex arm 1300 is in a flex position.

While the example depicted in FIG. 13 depict a first and a second layer, any appropriate number of layers may be used in accordance with the present disclosure. For example, the flex arm may include three to six layers. In such an example with three layers, each layer may include at least one electrode. In other examples, at least one of the layers may not have an electrode.

In some examples, multiple sets of electrodes are distributed throughout the layers to have more than one point for measuring the capacitance changes between the layers. In some examples, the multiple electrode pairs may be distributed down the length of the flex arm, across the width of the flex arm, diagonally across the surface of the flex arm, or distributed in another arrangement in the flex arm.

Figure 14:
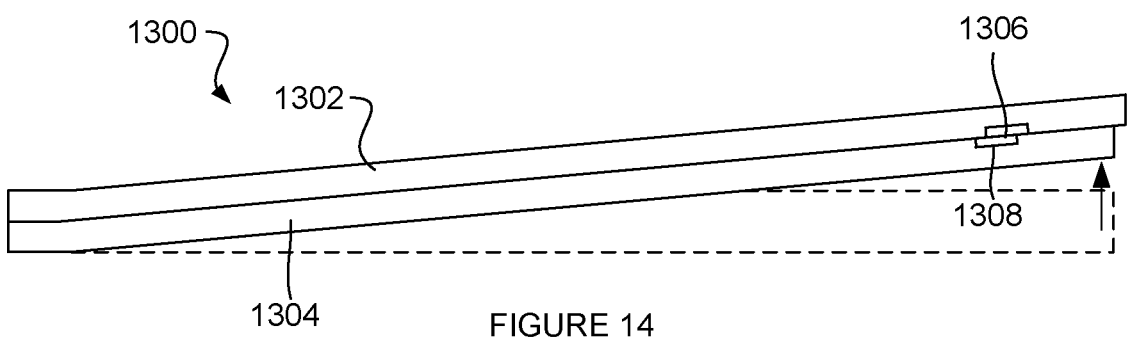
FIG. 14 depicts an example of a flex arm with a top layer and a bottom layer, where the top and bottom layers are configured to move relative to one another as the flex arm flexes according to the present disclosure.

In the example of FIG. 14, the first layer 1302 and the second layer 1304 move along the interface 1400 between the first and second layers 1302, 1304 with respect to each other when the flex arm 1300 is in a flex position. In this example, the first and second layer 1302, 1304 may be configured to slide with respect to each other when the applied forces cause the substrate to move downward with respect to the housing. In some examples where the first and second layers 1302, 1304 move due to the applied force, the first and second layers 1302, 1304 may include an elasticity that is sufficient to cause the first and second layers 1302, 1304 to substantially move back, and thereby move the first and second electrodes 1306, 1308 back to the rest position when the applied force is removed from the substrate.

Figure 15:
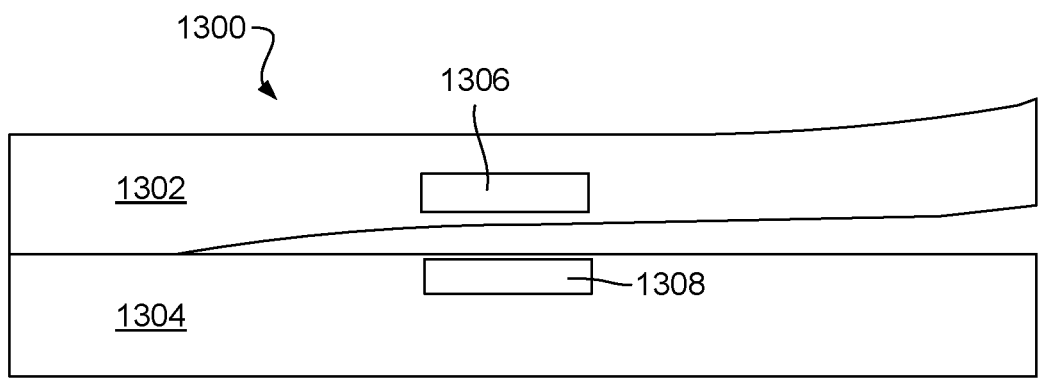
FIG. 15 depicts an example of a flex arm with a top layer and a bottom layer, where the top and bottom layers are configured to move vertical with respect to each other when the flex arm flexes according to the present disclosure.

FIG. 15 depicts an example where the first layer 1302 and the second layer 1304 separate when the flex arm 1300 is in a flex position. As the first layer 1302 separates from the second layer 1304, the distance between the first electrode 1306 and the second electrode 1308 increases. The capacitance between the first electrode 1302 and the second electrode 1304 may change based on this distance. Thus, when the first and second layers 1302, 1304 separate, the capacitance between the first and second electrodes 1306, 1308 may change, which can be used to determine the current flex position of the flex arm 1300.

Figure 16:
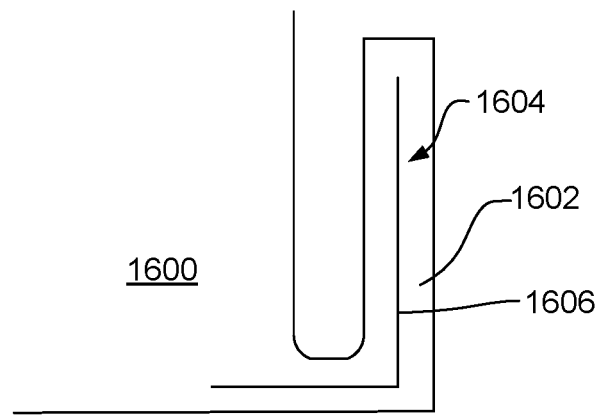
FIG. 16 depicts an example of a flex arm with a resistive ink electrode deposited thereon according to the present disclosure.

FIG. 16 depicts an example of a substrate 1600 with a flex arm 1602 and an electrical resistive sensor 1604 deposited on the flex arm 1602. In this example, the electrical resistive sensor 1604 includes an electrode 1606 that is made of a resistive material, such as resistive ink or another type of resistive material. The resistive ink may include the characteristic of exhibiting different electrical resistance values based on the tension exerted on the electrode 1606. For example, when the flex arm 1602 is in the rest position, the electrical resistivity of the electrode 1606 can be measured and provide a baseline electrical resistivity. When the flex arm 1602 is in a flex position, the tension on the surface of the flex arm may change. For example, the flex arm's position may result in a surface of the flex arm 1602 forming a convex shape, which may cause an increase in tension on the electrode 1606. This increase in tension may alter the measured electrical resistance on the electrode 1606 and may be used to determine the flex position of the flex arm 1602. In other examples, the flex position of the flex arm 1602 may cause the surface to form a concave shape, which may result in a lower amount of tension on the flex arm 1602. Such an example may cause the electrode 1606 to have a different electrical resistance that can be used to determine the flex arm's position. In other examples, the position of the flex arm may result in both sides of the flex arm 1602 being elongated, which may also assist in determining the flex position.

Figure 17:
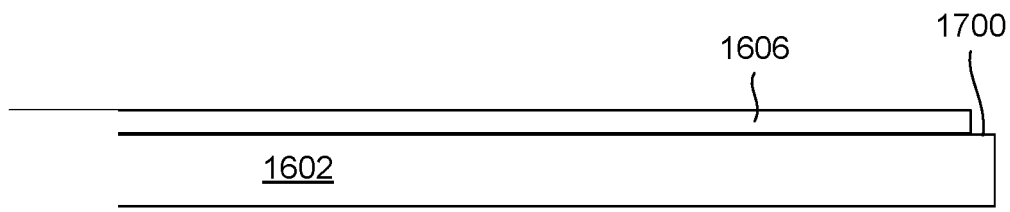
FIG. 17 depicts an example of a flex arm with a resistive ink electrode deposited on a top surface according to the present disclosure.
Figure 18:
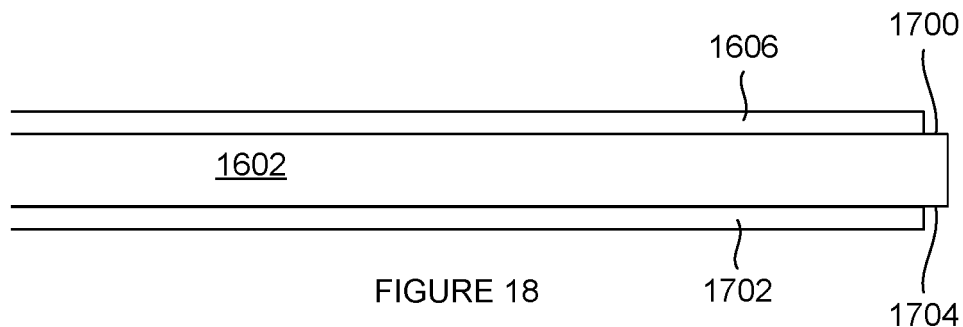
FIG. 18 depicts an example of a flex arm with a first resistive ink electrode deposited on a top surface and a second resistive ink electrode deposited on a bottom surface according to the present disclosure.

FIG. 17 depicts an example where a first resistive ink electrode 1606 is deposited on a first surface 1700 of the flex arm 1602. FIG. 18 depicts an example where a first resistive ink electrode 1606 is deposited on a first surface 1700 and a second resistive ink electrode 1702 is deposited on a second surface 1704. In some examples, some flex positions may result in the first surface 1700 having a different amount of tension than the second surface 1704. As the result, the first electrode 1606 may have a different change in electrical resistance than the second electrode 1702. The change in resistance of 1702 typically decreases with flexure of 1602 while the resistance change in 1606 typically increases. These differential measurements may be used to determine the flex position of the flex arm 1602 while minimizing the effects of residual stresses or long term drift or temperature or humidity or mechanical changes.

Figure 19:
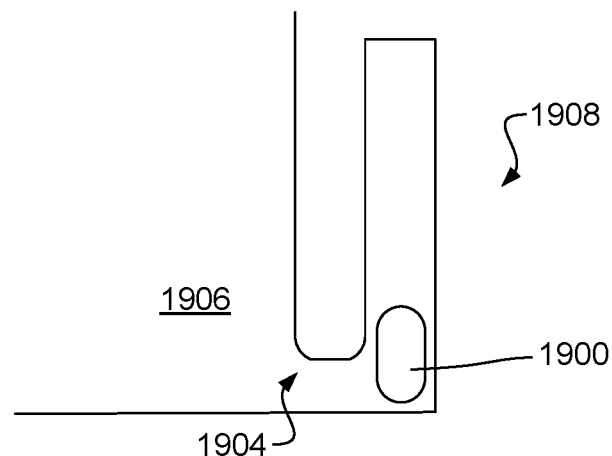
FIG. 19 depicts an example of a flex arm forming a flex joint with a substrate of a touch sensor where a strain gauge is attached at the flex joint according to the present disclosure.

FIG. 19 depicts an example of a strain gauge 1900 adhered to a surface of the flex joint 1904 formed between the substrate 1906 and the flex arm 1908. The stain gauge may be a commercially available strain gauge that has a preconfigured circuit for sensing the strain. In an alternative example, circuitry for sensing changes in strain may be deposited on the flex arm, including at the flex joint.

Figure 20:
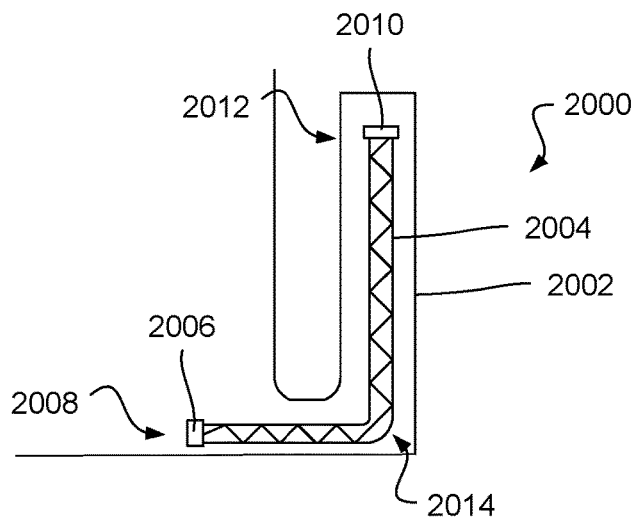
FIG. 20 depicts an example of an optical fiber attached on the flex arm according to the present disclosure.

FIG. 20 depicts an example of an optical sensor 2000 secured to the flex arm 2002. In this example, a fiber optical channel 2004 connects a light source 2006 at a first end 2008 to a light receiver 2010 at a second end 2012. Light from the light source 2006 may be internally reflected down the length of the fiber optical channel 2004 to the light receiver 2010 where an intensity of the received light can be measured. A bend 2014 in the fiber optical channel 2004 may have the characteristic of affecting the amount of light, thereby affecting the light intensity, that reaches the light receiver 2010. In some examples, the bend 2014 of the fiber optical channel 2004 when the flex arm 2002 is in a rest position may allow an amount of light to reach the light receiver 2010. This amount of light may be referred to as the baseline light intensity. In some examples, when the flex arm 2002 changes angles, the bend 2014 may be bent to a more acute angle and cause a decrease in the amount of light that reaches the light receiver 2010. In some cases, the decrease in light may result in a lower light intensity measured at the light receiver 2010. In some cases, the sharper the angle formed, the lower the light intensity measured with the light receiver 2010. In yet other cases, the change in the bend may result in the light being completely cut off from the light receiver 2010 thereby registering no light intensity measured. The measured light intensity may be used to determine the flex position of the flex arm 2002.

Figure 21:
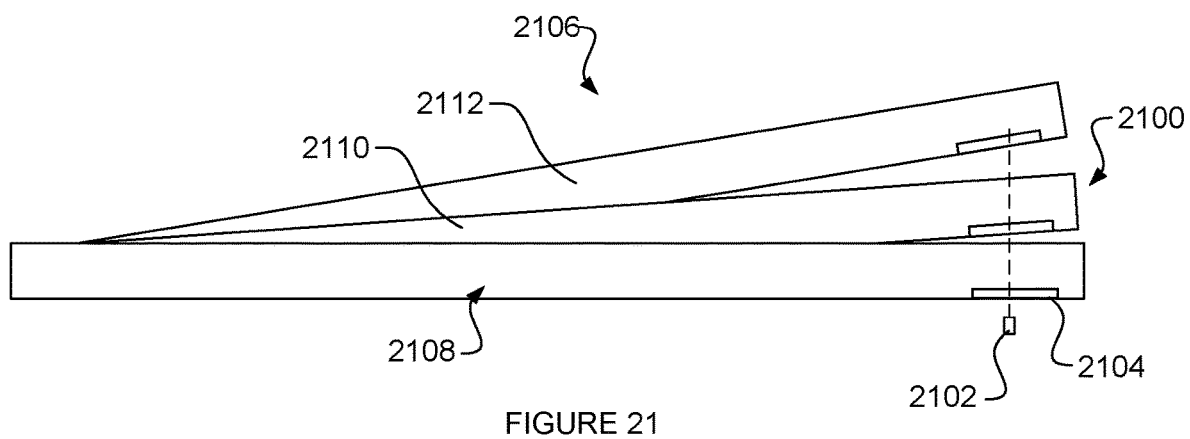
FIG. 21 depicts an example of an optical source directing a light beam towards a photo transistor on a flex arm according to the present disclosure.

FIG. 21 depicts an example of the flex arm 2106 bent in multiple positions: a rest position 2108, a first flex position 2110, and a second flex position 2112. In the depicted example, the flex arm 2106 includes an optical sensor 2100. In this example, the optical sensor 2100 includes a light source 2102 and a photo transistor 2104 located on the flex arm 2106. The light source 2102 may be positioned to direct the light towards the photo transistor 2104. As the flex arm 2106 bends, the angular position of the flex arm 2106 also changes. The change in the angular position may also change the relative lateral position of the photo transistor 2104 and the light source 2102.

The light source 2102 may be secured to a structure that is independent of the flex arm 2106 so that the flex arm 2106 is mechanically isolated from the movements of the flex arm 2106. In at least some of these types of examples, as the flex arm 2106 moves, the light source 2102 may continue to direct the light beam towards the same three-dimensional space regardless of what relative position the flex arm 2106 takes. Thus, the relative location on the photo transistor 2104 where the light beam falls may change as the flex arm 2106 moves. The photo transistor 2104 may be capable of determining the location where the light beam contacts the photo transistor 2104. In some examples, the location where the light beam contacts the photo transistor 2104 when the flex arm 2106 is in a rest position may be referred to as a baseline location. As the flex arm 2106 moves due to the applied force on the substrate, the change in the contact location may be measured and used to determine the flex position of the flex arm 2106.

Figure 22:
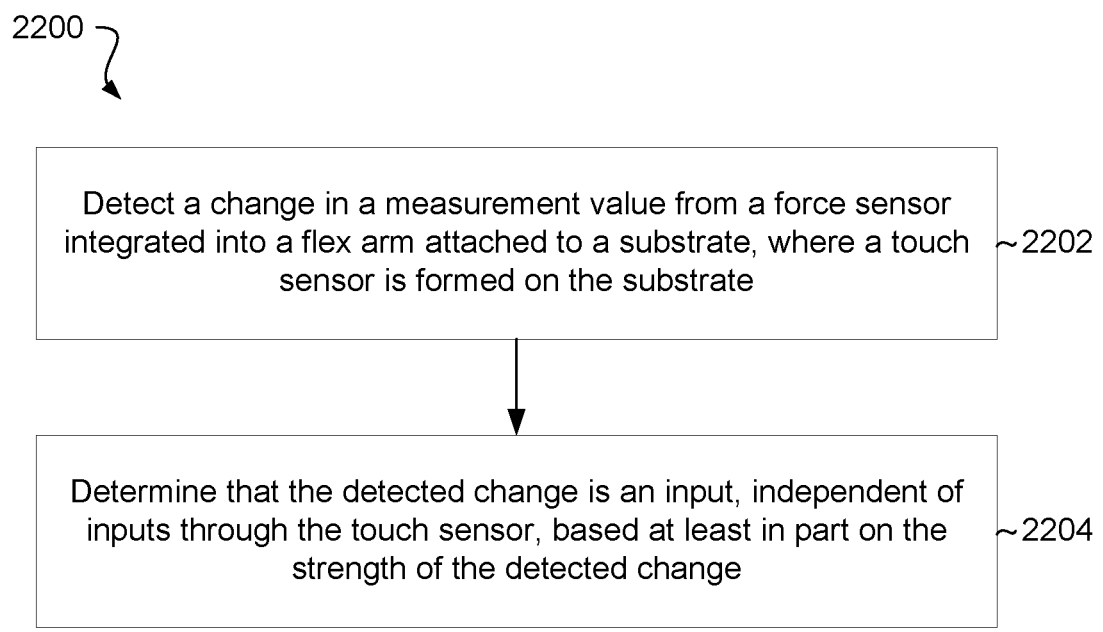
FIG. 22 depicts an example of using a touch sensor according to the present disclosure.

FIG. 22 depicts an example of a method 2200 of using a touch sensor. This method 2200 may be performed based on the description of the devices, modules, and principles described in relation to FIGS. 1-21. In this example, the method 2200 includes detecting 2202 a change in a measurement value from a force sensor integrated into a flex arm attached to a substrate, where a touch sensor is formed on the substrate; and determining 2204 that the detected change is an input, independent of inputs through the touch sensor, based at least in part on the strength of the detected change.

The force sensor may be any appropriate type of sensor, including, but not limited to capacitance sensors, optical sensors, electrical resistance sensors, strain gauges, inductive sensors, magnetic sensors, sonic sensors, infrared sensors, other types of sensors, or combinations thereof. In some cases, the force sensors may detect a change in a measurement reading from the baseline measurement reading. This change may be used to determine the distance that the substrate has moved. In some examples, the distance that the substrate moves may be correlated with the force applied on the substrate, the flex position of the flex arm, another parameter, or combinations thereof.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A system that provides mechanical movement of a surface of a touch sensor when force is applied, comprising:
    a substrate;
    a touch sensor formed directly on a same surface of the substrate, the touch sensor being a capacitive sensitive touch area defined by multiple electrodes on the substrate;
    a flex arm coupled to the same surface of the substrate forming a flexible joint between the substrate and the flex arm;
    a housing for the touch sensor, the housing supporting the touch sensor at a distal end of the flex arm; and
    a force sensor integrated into the flex arm.

2. The system of claim 1, wherein the force sensor is a capacitance sensor.

3. The system of claim 2, wherein the force sensor includes a transmit electrode formed on the flex arm.

4. The system of claim 2, wherein the force sensor includes a sensor electrode formed on the flex arm.

5. The system of claim 2, wherein a transmit electrode and a sense electrode of the capacitance sensor are configured to measure a capacitance value across a gap defined between the flex arm and the substrate.

6. The system of claim 1, wherein the force sensor is an electrical resistance sensor.

7. The system of claim 6, wherein the electrical resistance sensor includes a deposited ink that changes electrical resistance when the flex arm flexes.

8. The system of claim 6, wherein the electrical resistance sensor includes a first trace of deposited ink that changes electrical resistance deposited on a first surface of the flex arm and a second trace of deposited ink that changes electrical resistance deposited on a second surface of the flex arm;
    wherein the second surface is opposite to the first surface.

9. The system of claim 1, wherein the force sensor is a strain gauge.

10. The system of claim 1, wherein the force sensor is an optical sensor.

11. The system of claim 10, wherein the optical sensor includes:
    an optical fiber attached to the flex arm;
    a light source connected to the optical fiber at a first end; and
    a light receiver connected to the optical fiber at a second end;
    wherein the optical fiber is configured to transmit an internal light from the light source to the light receiver;
    wherein an optical intensity of internal light received at the light receiver is configured to vary based on a flex position of the flex arm.

12. The system of claim 10, wherein the optical sensor includes:
    a photo transistor attached to a surface of the flex arm;
        a light source position adjacent to the flex arm and oriented to direct a beam of light at the photo transistor;
        a processor and memory, wherein the memory includes programmed instructions that are configured to cause the processor to determine a flex position of the flex arm based on a location that the light beam contacts the photo transistor.

13. The system of claim 1, wherein the touch sensor is a buttonless touch sensor having no mechanical buttons for performing mouse click functions.

14. The system of claim 1, wherein the flex arm is a first flex arm of multiple flex arms forming multiple flexible joints with the substrate;
    wherein each of the flex arms has a force sensor integrated thereon.

15. The system of claim 1, wherein the touch sensor has a shape with a first corner, a second corner, a third corner, and a fourth corner;
    the first flex arm forms a first flexible joint with the substrate at the first corner;
    the second flex arm forms a second flexible joint with the substrate at the second corner;
    the third flex arm forms a third flexible joint with the substrate at the third corner; and
    the fourth flex arm forms a fourth flexible joint with the substrate at the fourth corner.

16. The system of claim 1, wherein the substrate, on which the touch sensor is formed, and the flex arm are made of the same continuous piece of printed circuit board.

17. A system that provides mechanical movement of an entire surface of a touch sensor when force is applied, said system comprising:
    a substrate for a touch sensor, the touch sensor being a capacitive sensitive touch area defined by multiple electrodes formed directly on a same rectangular surface of the substrate;
    four flex arms wherein each one of the four flex arms is coupled to a different corner of the same rectangular surface of the substrate having the capacitive sensitive touch area and flexing at a joint between the substrate and the four flex arms;

a housing for the touch sensor, the housing supporting the touch sensor at a distal end of each of the four flex arms;

a touch sensor disposed on the surface of the substrate; and a force sensor integrated into the flex arm;

wherein the touch sensor is a buttonless touch sensor having no mechanical buttons for performing mouse click functions, and wherein applying a force against the rectangular surface of the touch sensor causes the top surface of the touch sensor to move within the housing to provide haptic feedback to the user while the substrate is flexing at the joint of each of the four flex arms, to thereby provide movement to the buttonless touch sensor.

18. The system of claim 17, wherein the force sensor is a capacitance sensor.

19. The system of claim 17, wherein the force sensor is an electrical resistance sensor.

20. A computer-program product for using a touch sensor, the computer-program product comprising a non-transitory computer-readable medium storing instructions executable by a processor to:

detect a change in a measurement value from a force sensor integrated into a flex arm attached to a same surface of a substrate, where a touch sensor is formed directly on the same surface of substrate;

the touch sensor being a capacitive sensitive touch area defined by multiple electrodes on the substrate; and determine that the detected change is an input, independent of inputs through the touch sensor, based at least in part on the strength of the detected change;

wherein the flex arm is formed on the same surface of the substrate on which the capacitive sensitive touch area defined by multiple electrodes is formed.

* * * * *